Aug. 24, 1937.  W. W. SIMMONS, JR  2,090,815
SEALED VEHICLE BODY
Filed Feb. 18, 1935  3 Sheets-Sheet 3
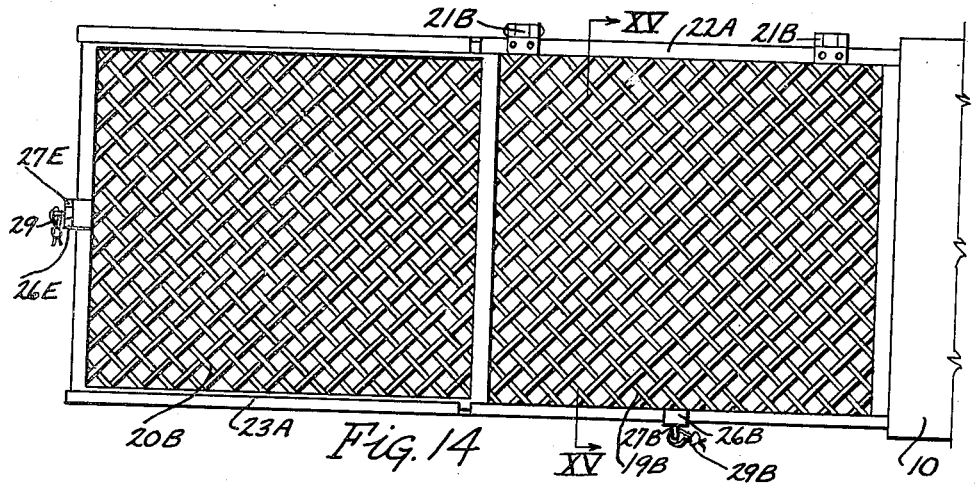
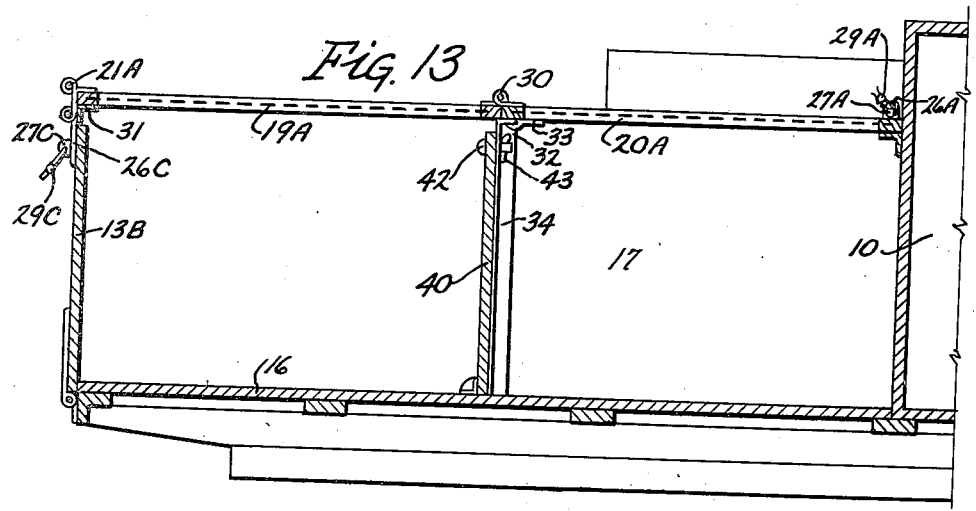
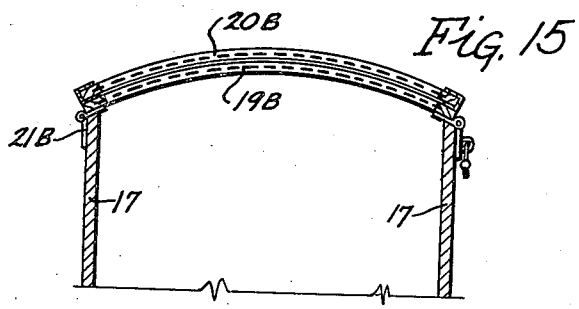
INVENTOR
WILLIAM W. SIMMONS Jr.
by J. H. Weatherford
Atty.

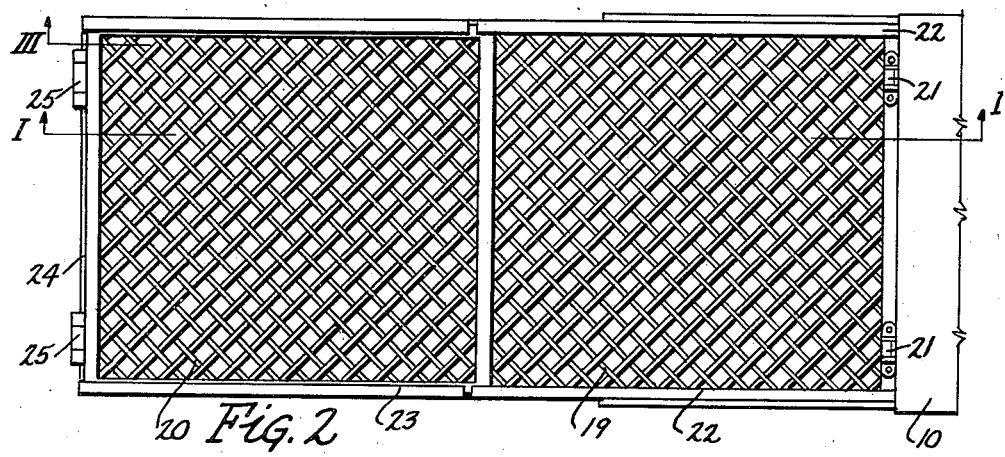
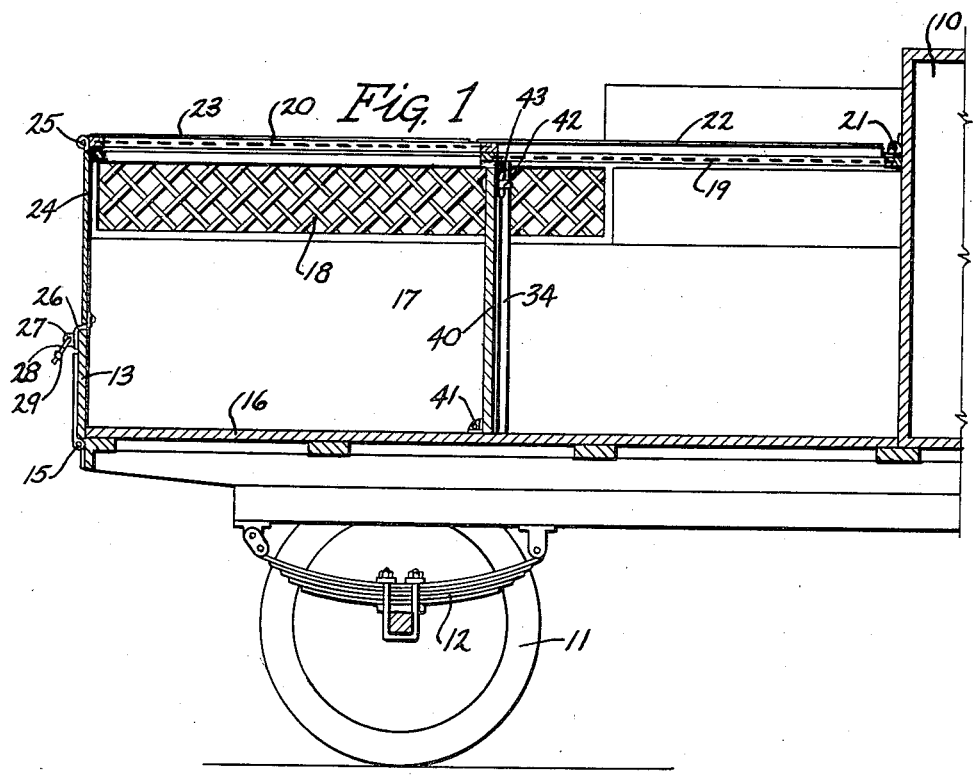
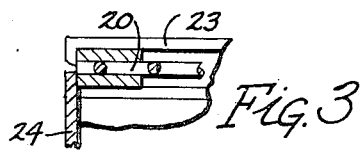

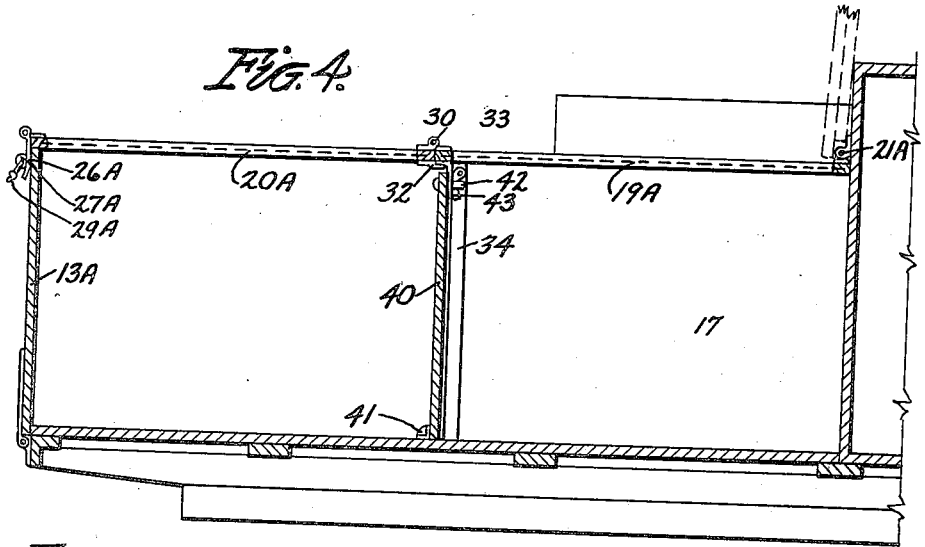
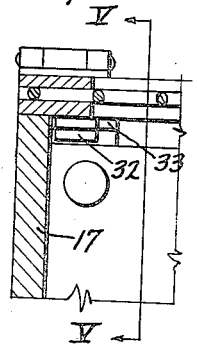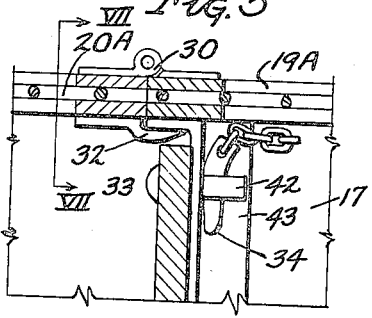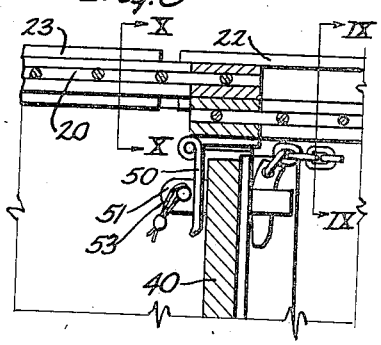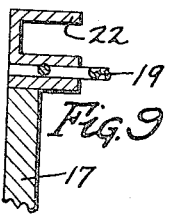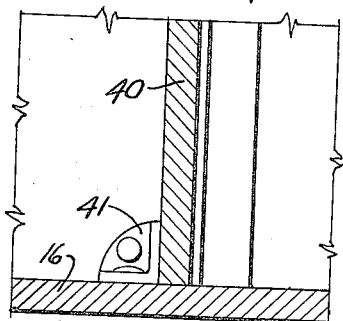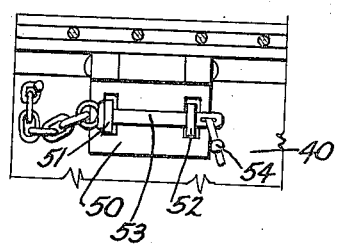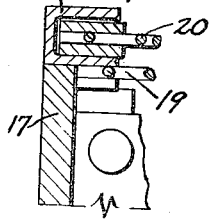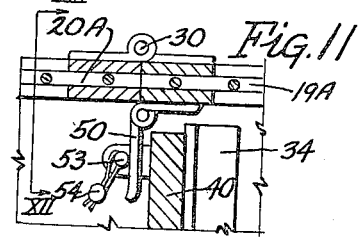

Patented Aug. 24, 1937

2,090,815

UNITED STATES PATENT OFFICE 2,090,815

SEALED VEHICLE BODY

William W. Simmons, Jr., Memphis, Tenn.

Application February 18, 1935, Serial No. 7,021

1 Claim. (Cl. 296—100)

This invention has general reference to vehicle bodies of that type shown in my previous application for patent, Serial No. 645,641, filed December 5, 1932, allowed January 16, 1935, in which weighed, measured, or otherwise fixed, quantities of certain commodities are delivered from the vendor to the vendee, and which it is desired to protect against unauthorized access between the time and place of loading and the time and place of delivery. But more specific reference will be made hereinafter to vehicle bodies such as those of coal trucks, and the like which ordinarily receive their contents at the top of the body and discharge them at the rear end of the body; to means common to both a top closure member and an end closure member for preventing unauthorized access to the interior of such body either at the top or at the end; and comprehensively, to a method for sealing such bodies.

It has further reference to a body of this type in which provision is made for access to the entire top of the body for loading and in which provision may be made for dividing the contents of the bed of the body into two or even more parts, and for the delivery of the part loads in such body in succession.

Especially in the case of coal intended for domestic use, losses to purchasers between the point at which the load is weighed and the residence at which it is delivered, usually due either to surreptitious purloining from the truck or to dishonesty of the driver, not only are frequent and both annoying and expensive, but heretofore it has been found practically impossible to guard against them.

My present invention contemplates equipping the truck body with a top closure in two parts one of said parts being hinged at the forward end of the body and the other hinged to or slidably movable with respect to the first part, both in addition to the usual movable tail board; providing securing means common to the second of said parts and said tail board for retaining both thereof in closed position; and applying to such retaining means locking means or a seal, preferably such as is commonly used for sealing the box car type of railway cars, so that access cannot be had to the interior of the truck body either at the top or the end, without breaking such sealing means. When the truck has been loaded, and either before or at the time it and its load are weighed, the seal is applied, and is intended to remain unbroken until the truck reaches the place of delivery and the seal is broken in the presence of the purchaser or his authorized representative.

It further contemplates means by which the completion of the closure of the top precedent to the locking thereof will effect securing the top intermediate its ends, and will also prevent access to and release of the load division member, should the same be used.

The primary object of the present invention is to provide a vehicle body to the interior of which access may be had through a plurality of openings, having a closure member for each of said openings, having means common to said closure members for retaining them in closed position, and such retaining means being adapted to receive a seal or the like, which must be broken or defaced before any one of said closure members can be moved to afford access to the interior of said body.

A further object is to provide a movable top closure member for a vehicle body having an open top, which closure member is made in two or more parts relatively movable with respect one to the other either slidably or hingedly, said movable top member being hingedly connected as a whole to the body, whereby complete opening of the top of said body to provide access thereto for loading may be had, said top having sealing means effective to prevent access to any part thereof, and opening in successive increments toward said hinged end, the opening of each increment releasing the adjacent increment to allow opening thereof.

A still further object is to provide an open top vehicle body having end closure means and one or more division walls to subdivide the body into load receiving compartments, and provide end closures therefor, and a top comprising a similar number of sections and sealing means for jointly sealing said end closures and said top, each of said sections being movably connected to the adjacent section, each said section when closed preventing access to the securing means of the related end closure of its related compartment.

The means by which the foregoing and other objects are accomplished, and the manner of their accomplishment, will readily be understood from the following specification on reference to the accompanying drawings in which,—

Fig. 1 is a sectional side elevation taken as on the line I—I of Fig. 2, showing the load receiving portion of a vehicle body provided with a load dividing partition wall and a two part top closure, one closure part being slidable with respect to the other.

Fig. 2 is a corresponding plan view.

Fig. 3 is an enlarged fragmentary section taken on the line III—III of Fig. 2.

Fig. 4 is a sectional elevation similar to Fig. 1 showing a modification of the device in which the top sections are hingedly secured together.

Figs. 5 and 6 are enlarged sectional elevations respectively of the top and bottom portions of the division wall, and the hinge joining the two top sections.

Fig. 7 is a fragmentary section taken as on the line VII—VII of Fig. 5.

Fig. 8 is a fragmentary enlarged sectional elevation of the upper portion of the division wall shown in Fig. 1.

Figs. 9 and 10 are respectively fragmentary sections taken on the line IX—IX and X—X of Fig. 8.

Fig. 11 is a fragmentary sectional elevation taken substantially along the longitudinal center line of the body shown in Fig. 4, and showing the upper end of the division wall and means for locking the grills thereto.

Fig. 12 is a fragmentary transverse sectional elevation taken on the line XII—XII of Fig. 11.

Fig. 13 is a longitudinal sectional elevation corresponding to Figs. 1 and 4 showing a modified form of top closure.

Fig. 14 is a plan view of an additional modified form of top closure; and

Fig. 15 a fragmentary transverse sectional elevation taken on the line XV—XV of Fig. 14.

Referring now to the drawings in which the various parts are indicated by numerals, 10 indicates the cab of the vehicle which may have the usual wheels 11 and springs 12 (only one of each of the latter being shown); said vehicle being of a type commonly used for transporting coal and preferably having the usual tail board 13, which is pivotally movable outward and downward on a pivot rod passing through hinges 15 secured at the rear end of the floor 16 of the vehicle body. 17 are the sides of the load retaining portion of the truck body, and since the sides of truck bodies of this type frequently are higher at the forward end of the body than elsewhere, a grill or the like 18 is added to each side so as to render such sides of uniform height throughout, or this may be otherwise done. The top of the vehicle body is closed by suitable top members 19 and 20 of approximately equal size, though one may be slightly longer or wider than the other. These top members may be grills similar to the grill 18. The grill 19 is hingedly connected as by hinges 21 at the top edge of the body, this hinging as shown in Figs. 1, 2, and 4 preferably being at the forward end of the body.

Mounted on and firmly secured to the opposite side frames of the grill 19 are facing channel-ways 22 (shown in the enlarged detail views, Figs. 8, 9, and 10), these channel-ways swinging upward with the hinged grill 19 when this is opened. Mounted on and secured to the top of the side grills 18, are similar facing channel-ways 23, these latter channel-ways being in alignment with their respective-side channelways 22 when the vehicle top is closed. The grill 20 is slidably mounted in the channel-ways 23, but projects beyond such channel-ways into the channel-ways 22, and is adapted to be slid toward the forward end of the body and entirely into the channel-ways 22. To accomplish this, it is necessary that the effective length of the channelways 22 be substantially equal to the length of the grill 20 and that both of these be of slightly greater length than the channel-ways 23. By such construction when the top of the vehicle body is closed the grill 20 disposed in the channel-ways 23 and extending into the channel-ways 22 securely locks the swinging end of the grill 19 against opening. 24 is an end gate connected to the grill 20 as by hinges 25. When closed the end gate 24 extends downward into substantial contact with the tail board 13, and may be secured thereto by a hasp 26 and staple 27. A railway type seal comprising a metal strip 28 and a lead button 29 which upon being compressed secures the two end portions of said strip together, being employed for retaining the hasp 26 against disengagement from the staple 27. Before access can be had to the interior of the truck body either at the top or at the rear end, and before the tail board 13 can be dropped to permit the contents of the body to be discharged therefrom, the seal must be broken and removed from the the staple 27 so that the hasp 26 may be disengaged therefrom. When so disengaged the end gate 24 may be swung upward and may lie on top of the grill 20 and when so swung out of the way permits the grill 20 to be slid forward out of the channel-ways 23 and into the channelways 22, permitting the grill member 19 and its superposed grill member 20 to be swung upward around the hinges 21, and uncovering the entire top of the vehicle body as for loading purposes.

In Figs. 4 and 13 and the detail Figs. 5, 11, and 12, referring thereto, a modified form is shown in which grills 19A and 20A are connected together by hinges 30, it being particularly noted that in Fig. 13 the position of these grills has been reversed with regard to the front and rear ends of the body and that the hinges 21A are at the rear end of the body and are secured to a transverse member 31, and that the securing hasp 26A, staple 27A, and seal 29A are in such case at the forward end of the body. Secured to the underside of the grill 20A, at the end thereof carrying the hinges 30, are lugs 32 which are adapted to swing into engagement with cooperating members 33 secured to the vehicle body when the top is closed, both the lugs 32 and the cooperating members 33 lying adjacent the sides 17 in order that the members 33 may be directly secured to such sides. The members 33 may form a part of angle iron members 34, hereinafter described.

In Figs. 4 and 13 a modified form of tail gate 13A (or 13B) is shown, which is of substantially full body height with no end gate portion hinged to the grill and extending downward. It will be understood that this form of gate is interchangeable with the tail gate and depending gate structure of Fig. 2 and with all of the top section forms.

In Fig. 4 the grill 20A is secured directly to the upper end of the tail gate 13A by the hasp 26B, staple 27B, and seal 29B. In Fig. 13 a hasp 26C is carried by the cross-member 31 and the tail gate is provided as before, with the staple 27C and seal 29C.

In Figs. 14 and 15 a modification is shown in which sliding grill members 19B, 20B effect the closure of the top. In this form of the device a side edge of the grill 19B is hingedly secured to a side 17 of the body as by hinges 21B, the opposite side of the grill member 19B being fastened by a hasp member 26D, staple 27D, and seal 29D. The grill 20B is slidably mounted in channelways 23A secured to the top edges of the sides 17. The grill 19B has secured thereto complementary channel-ways 22A aligned as before with the channel-ways 23A, the grill 20B extends beyond the channel-ways 23A into the channel-ways 22A preventing opening of the grill 19B. The grill 20B is as before, slidable from the channel-ways 23A into the channelways 22A. When nested the seal 29B may be broken, the hasp 27B released, and the nested grills be turned upward about the hinges 21B to uncover the remaining half of the body. When the body is closed the grill 20B may be sealed to the tail gate by the hasp 26E, staple 27E and seal 29E. These grills 19A, 20A may be of arcuate section as shown in Fig. 15.

To divide the body into compartments, usually of equal size, an intermediate gate or division wall 40 is positioned against the angle irons 34, before mentioned. These angle irons are secured to the sides 17 of the body and extend substantially from bottom to top thereof. 41 are corner irons or brackets which are secured to the sides 17 and the floor 16, these brackets being spaced from the angle irons 34, to form pockets for the reception of the bottom corners of the division wall 40. The angle irons 34 are provided with suitable apertures adjacent their upper ends, to receive locking bolts 42 which are carried by division wall 40 and extend through the apertures. The ends of these locking bolts so extended are slotted to receive keys 43, and when the keys are in place, hold the division wall against the angle irons 34. The grill 19, (or 19A, 19B) cover these keys and prevent access to them so long as the grill is held in place. Hingedly secured to and depending from the grill 19 preferably at the center, laterally thereof is a plate 50, having two vertically disposed slots adapted to receive complementary lugs 51, 52 secured to and projecting from the division wall 40. These lugs are provided each with an opening through which a headed bolt 53 may be passed. This bolt is held from displacement by a railroad type of seal 54 preferably identical with those before described which must be destroyed before the grill 19 can be opened to permit access to the keys 43 for their removal.

It will be understood that the "top sections" herein referred to as "grills" are preferably so made largely to reduce weight, but that solid sections might be as readily used. The term "section" in the claims is the "grill".

It will be understood that while only two top sections or grills are shown, and a single division wall, that three sections may be used with two division walls quite as readily and a three part load be carried, or that even more divisions might be employed without departing from my invention.

In using that type of body shown in Fig. 1 the grill 20 is slid back over the grill 19 and the nested grills turned upward about the hinges 21 to permit loading of the body. If half loads are to be delivered the bottom corners of the division wall 40 are seated in the pockets between the lugs 41 and the angle iron 34 and the top end of the wall secured by passing the bolts 42 through the angles 34 and driving the wedges 43 into place, and the front half of the body filled and weighed. The nested grills are swung downward into place, the locking plate 50 is seated, the bolt 53 is inserted and the seal 54 placed and secured. The rear half of the body is then filled and weighed; the grill 20 is slid backward into place, the end gate 24 swung down and secured by the hasp 26 and staple 27, and the seal 29. The truck is then driven to the point of delivery, the rear seal 29 is broken, the tail and end gates are swung open and the rear half load delivered. The truck is then driven to the next point of delivery, the end gate 24 swung up on the grill 20, and the grill 20 is slid forward and nested with the grill 19. This gives access to the seal 54 which is now broken, the locking plate 50 is released and the nested grills are swung upward about the hinges 21 giving access to the keys 43 which are driven out and the division wall allowed to be dropped out of place by the weight of the load. The load is then delivered and the truck returned to the loading point.

Where a full load is to be delivered the division wall is left out, the body is loaded and weighed, the nested top sections are turned down into place and the top grill 20 slid rearwardly securing the front grill 19, the locking and sealing of the rear end being completed as before and access for delivery of the entire load being had in identical manner with access to the rear half load as before described.

In using the form of body shown in Fig. 4, the action is identical except that locking of the front grill is accomplished by swinging the rear grill 20A downward about the hinges 30, the closure of the rear end of the grill 20A is made directly to the top of the tail gate, the seal inserted and clamped and delivery is thereafter made as before described.

In making use of that form shown in Fig. 13, loading is proceeded with as before. Sealing is accomplished for the rear load by means of the hasp and staple 26C, 27C and the seal 29C, and access to the division wall for releasing the same is made by breaking the seal 29A at the forward end of the body.

In using that form of the device shown in Figs. 14 and 15, access to the rear load of two half loads or to a full load is accomplished by breaking the seal 29E at the rear of the truck and for the front one of two half loads, access is had to the division-wall-securing-keys by breaking the side seal 29B and turning the nested grills upward about the side hinges 21B.

In the above an open top vehicle body, an openable rear end for the discharge of the load has been described. It will be understood however that provision may be made in such a body for discharge of the load at another point as for instance at one side or the bottom, but such construction having no inherent part in my invention need not be illustrated.

Also it is to be understood that the "seal" is intended to cover not only any seal which must be actually destroyed, but also any locked member which must be unlocked, and therefore as a "locked" member destroyed.

What I claim is:

In an open top vehicle body, a top closure comprising two sections, means hinging a first of said sections to the top edge of said body, means hinging the second of said sections to the first said section, said second section being openable about said latter hinging means into nesting relation with said first section, and said nested sections being jointly openable about the first said hinge means, a latch member fixedly secured to said body adjacent the movable end of said first section when in closed position, and a rigid cam-latch adapted to engage said latch member, said cam-latch being rigidly secured to said second section and operable by closing movement of said second section, after closure of said first section, to latch the hinged-together ends of said sections to said body.

WILLIAM W. SIMMONS, JR.